United States Patent
Albrile

[15] 3,681,940
[45] Aug. 8, 1972

[54] FRICTION CLUTCH
[72] Inventor: Walter Albrile, Turin, Italy
[73] Assignee: Ing. C. Olivetti & C., S.p.A., Ivrea(Torino), Italy
[22] Filed: July 10, 1970
[21] Appl. No.: 53,891

[30] Foreign Application Priority Data
  July 15, 1969   Italy.....................52646 A/69

[52] U.S. Cl. ............64/30 C, 192/70.14, 192/107 M
[51] Int. Cl..........................................F16d 7/02
[58] Field of Search............192/107 M, 70.14, 82 T; 64/30 C, 30 R

[56] References Cited
UNITED STATES PATENTS
3,376,714  4/1968  Manoni.........................64/30
   762,622  3/1904  Eastwood..................192/107

Primary Examiner—Benjamin W. Wyche
Assistant Examiner—Randall Heald
Attorney—Birch, Swindler, McKie & Beckett

[57] ABSTRACT

A friction clutch having at least one driven disk, a driving disk, and a friction disk interposed between each of the driven disks and the driving disk. The coefficient of friction between the driven disk and the friction disk is greater than the coefficient of friction between the driving disk and the friction disk when below a predetermined temperature and less than the coefficient of friction between the driving disk and the friction disk above the predetermined temperature.

8 Claims, 1 Drawing Figure

PATENTED AUG 8 1972 3,681,940
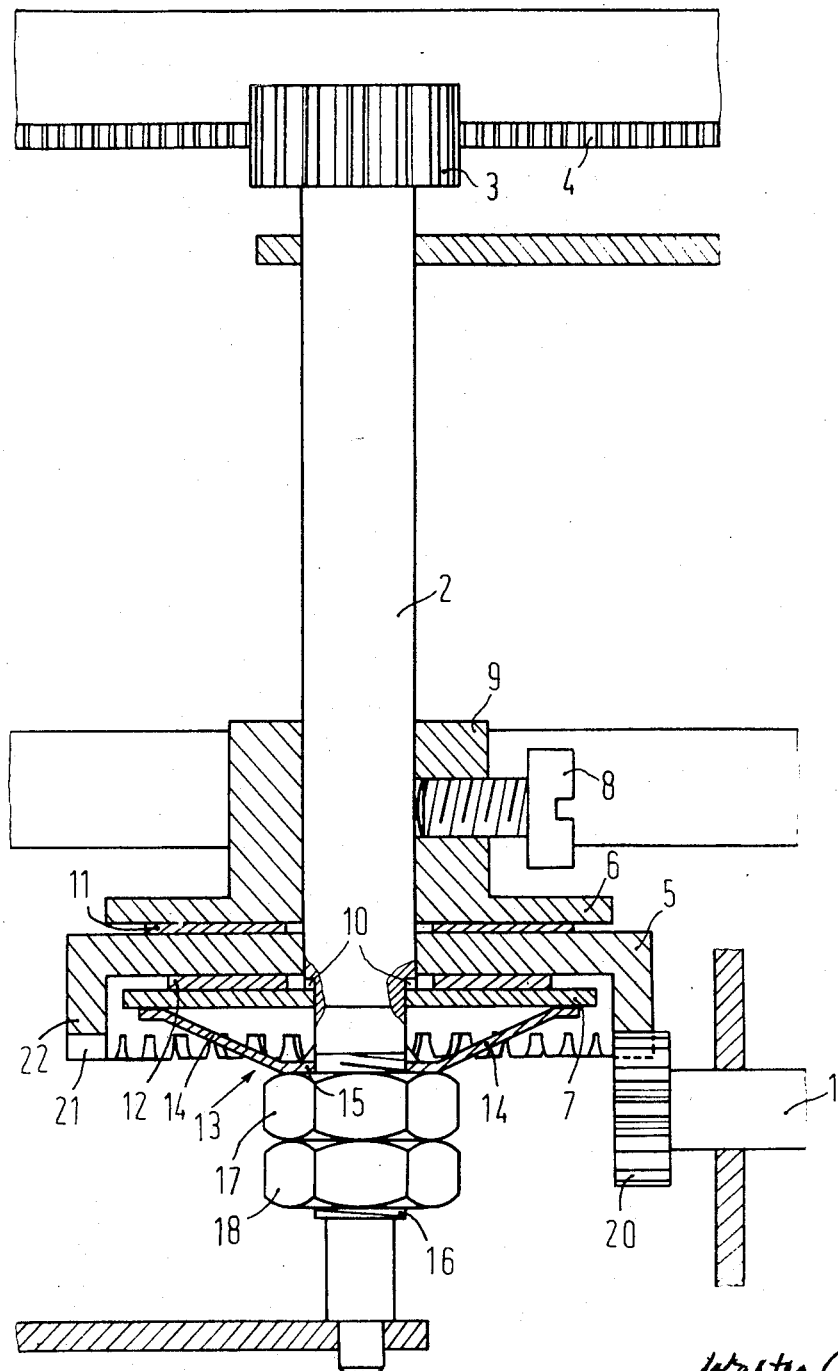
INVENTOR
Walter Abele
BY Birch, Swindler,
McKie & Beckett
ATTORNEY

FRICTION CLUTCH

BACKGROUND OF THE INVENTION

1. Field of the Invention

This invention relates to a friction clutch which has been particularly designed for use in typewriters and other business office machines, and in particular, to a friction clutch which enables high performance to be obtained even in difficult operating conditions such as are provided by electric typewriters.

2. Discussion of the Prior Art

As is well known in electric typewriters, the line feed of the carriage is normally obtained by means of either a clutch which is closed in order to wind up the usual spring ribbon or tape of the carriage, or by means of a rack-and-pinion assembly, whose pinion is caused to rotate, through a suitable transmission, by an electric motor, while the rack is integral with the carriage.

In this transmission a small clutch is normally inserted, which, owing to the sliding movements that can take place between the components thereof, avoids the occurrence of overloads on the carriage when the latter, due to any accidental cause, is arrested during its return stroke.

The friction clutches intended for use in electric typewriters normally comprise two metal disks, i.e. a driving and a driven disk, each of which is connected to a shaft of the transmission, between these disks being disposed a member or ring of cork (or other similar material) which is fastened to one of the disks. Resilient means, normally constituted by coil springs, will create a suitable pressure between the cork ring and the disks, so as to entrain by friction the driven disk when the motion is transmitted to the driving disk and to permit a sliding between these disks when the torque transmitted by the clutch exceeds a maximum predetermined value.

The known clutches of the kind described above suffer however from some drawbacks. First of all, their performance is noticeably influenced by both the environmental conditions (for instance, the cork ring can absorb moisture) and the operating conditions (prolonged sliding may lead to an increase of temperature), and in both cases a variation of the coefficient of friction results, which obviously determines, in turn, a variation of the maximum torque that can be transmitted by the clutch.

Moreover, a prolonged sliding of the clutch components may result in an excessive heating of the cork ring, with consequent breaking or failure of the latter or excessive overheating of the electric motor. In fact, in the clutches of this kind, the dissipation of the heat produced by friction is very poor, due to both the low heat conductivity of the material (cork) of which the friction rings are made and the structure of the clutches.

SUMMARY OF THE INVENTION

The object of the present invention is to avoid the disadvantages enumerated above.

In accordance with the present invention, there is provided a friction clutch comprising at least one driven disk which is integral with a driven shaft, and a driving disk which is idle relative to this shaft and to which a force generated by resilient means is transmitted, and a friction disk between the driving and driven two disks, the materials of the disks being such that, of the two pairs of contacting surfaces, the coefficient of one is higher than that of the other below a certain temperature but is lower than that of the other above this temperature.

DESCRIPTION OF THE PREFERRED EMBODIMENT

For a better understanding of the present invention, one particular embodiment thereof will now be described, by way of example, with reference to the accompanying drawing which shows a vertical section of the clutch embodying the present invention, connected to some parts of the device driving the carriage return mechanism of an electric typewriter.

The device driving the carriage of the electric typewriter comprises a motor shaft 1, which is normally driven by an electric motor through a coupling or clutch (not shown), and a driven shaft 2 whose end is integral with a toothed wheel or gear 3 in engagement with a rack 4, fastened to the carriage.

The friction clutch comprises a central driving disk 5, which is mounted idle on the driven shaft 2, and a pair of driven disks, 6 and 7 respectively, the first of which is secured to the driven shaft 2 by means of a grub screw 8 in a sleeve portion 9 formed integrally with the disk 6, whilst the other is rotatably connected to the same shaft and freely movable axially relative thereto by means of splines 10 in engagement with corresponding teeth of the disk 7.

Between the central driving disk 5 and the driven disks 6 and 7 two friction disks 11 and 12 are disposed, which are idle relative to the driven shaft 2.

A spring 13, essentially comprising a plurality of leaves 14 radiating from an annular central portion 15, is mounted idly on an extension 16 of the driven shaft 2 and is pushed axially upwards (as seen in the drawing) by a nut 17 (with a lock nut 18) which bears against the annular central portion 15 of the spring. The leaves 14 therefore press against the driven disk 7. This pressure, since the disk 7 is free to move axially relative to the driven shaft 2, is transmitted to the friction disk 12, as well as to the central driving disk 5, to the friction disk 11 (these disks being all axially free relative to the driven shaft 2) and, finally, to the driven disk 6 which is integral with the driven shaft 2.

In the case of the example shown in the drawing, the motion is transmitted to the central driving disk 5 through a toothed wheel or gear 20 integral with the driving shaft 1; this toothed wheel is in engagement with a crown gear 21, integrally formed in an annular portion 22 of the driving disk 5. In this arrangement the driving shaft 1 and the driven shaft 2 are disposed at right angles to one another. However, it is apparent that the central driving disk 5 can receive the motion from a motor shaft quite different from that shown, and that the latter shaft may form any angle desired with the driven shaft 2.

The disks 6, 7, 11 and 12 of the friction clutch described above are made of metal, whereas the disk 5 is of thermoplastic material. By constructing these disks with the materials specified, starting from the central driving disk 5 and proceeding either upwards or downwards in the drawing, we find first pairs of rubbing surfaces of plastics material and metal (i.e. the disks 5 and 11 and the disks 5 and 12) and then metal-metal pairs (disks 11 and 6, and disks 12 and 7).

The operation of the friction clutch is as follows. The motor shaft 1, which is driven by the electric motor (not shown), drives, through the gear wheel 20, the central driving disk 5, which is thus caused to rotate. Since, between the faces of the disk 5 and the disks 11, 12, 7 and 6, coupled together, pressures generated by the spring 13 are exerted, all these disks (if the restoring torque applied to the driven shaft 2 is less than a predetermined value) will rotate integrally with the disk 6 and, therefore, with the driven shaft 2 also. If, instead, the restoring torque applied to the driven shaft 2 exceeds the predetermined value mentioned above, as is the case when the carriage — which is integral with the rack 4 — encounters an excessive resistance, then between some of the surfaces coupled together of said disks some sliding movements will take place; in particular, these sliding movements initially occur between the faces of the disk 5 coupled with those of the disks 11 and 12. In fact, since the coefficient of friction between these surfaces of plastics material and metal coupled to one another is lower than the friction coefficient between metal-metal surfaces coupled together, the sliding limit will be reached in correspondence with the coupled faces of the disks 5 and 11 and 5 and 12, before reaching the sliding limit between the coupled surfaces of the disks 11 and 6, and 12 and 7.

As the sliding proceeds, the friction will generate a certain quantity of heat which, on account of the low conductivity of the plastics material of which the disk 5 is made, results in an increase of the temperature of this disk, whereby the coefficient of friction between the surfaces of the disks 5 and 11, and 5 and 12, coupled to one another, will tend to increase, ultimately exceeding that between the coupled surfaces of the disks 11 and 6, and 12 and 7.

From this point on the sliding movement between the last mentioned surfaces will start, whilst the sliding movement between the other coupled surfaces comes to an end; these surfaces, in the absence of sliding, will cool down in a short time. Thus, the coefficient of friction between them (plastics-metal coupling) will return to the initial value, which is less than that between metal surfaces. At this point, the situation concerning the sliding is again reversed, and the cycle described above tends to repeat itself indefinitely, as long as the restoring torque applied to the shaft 2 exceeds in value the maximum torque which can be transmitted by the clutch.

Therefore, the friction clutch described operates as if it were provided with two different sets of sliding surfaces working alternately, interrupting their operation (slipping) when the temperature thereof reaches an excessively high value and resuming such operation when the temperature has again fallen down to an acceptable value. In the interval of time when one of these sets of sliding surfaces is inoperative, the other set is operative, and the passage from one set to the other takes place in a fully automatic manner.

Therefore, with the friction clutch described above, it is possible to avoid — or at least to substantially reduce — any risk of seizure or "binding" of the clutch and of overheating of the electric motor and, in general, it enables operating conditions by far more severe than those normally permissible with the clutches of the prior art of the kind described to be withstood.

It is, however, apparent that many modifications and variations can be introduced in the friction clutch described. In particular, the transmission of motion from the motor shaft 1 to the central driving disk 5 can be realized in a manner quite different from that described and shown. Further, the resilient means — adapted to exert an adequate force on the disk 7 of the clutch and comprised of the spring 13 — can be replaced by one or more springs of different construction.

I claim:

1. A friction clutch for transmitting rotational motion comprising:
   a driven disk connected to an output element,
   a driving disk connected to a driving means to be driven in rotation, said driving disk being in opposed relationship to said driven disk and biased theretoward,
   a friction disk interposed between said driven disk and said driving disk,
   a first pair of engaging clutch faces, one of said faces being carried by said driven disk and the other of said faces being carried by said friction disk,
   a second pair of engaging clutch faces, one of said faces being carried by said driving disk and the other of said faces being carried by said friction disk,
   the coefficient of friction of one of said pairs being greater than the coefficient of friction of the other of said pairs below a predetermined temperature and less than the coefficient of friction of said other of said pairs above said predetermined temperature,
   so that when relative rotational motion occurs between said driving disk and said driven disk, sliding takes place alternately between said first pair of friction faces and said second pair of friction faces, depending upon whether the temperature of the sliding faces is greater or less than said predetermined temperature.

2. A friction clutch according to claim 1 wherein said output element is a driven shaft and said driven disk is mounted on and connected to said driven shaft to impart rotation thereto, and wherein said driving disk and said friction disk are freely mounted on said driven shaft.

3. A friction clutch according to claim 2 wherein said driving disk and said friction disk are biased axially toward said driven disk by spring means freely mounted on said driven shaft.

4. A friction clutch according to claim 3 wherein said clutch faces are integral with the respective said disks, and said driving disk is of thermoplastic material and said driven disk and friction disk are of metal.

5. A friction clutch according to claim 1 further comprising a second driven disk in opposed relationship to the side of said driving disk opposite said driven disk, said second driven disk being biased toward said driving disk,
   a second friction disk interposed between said driving disk and said second driven disk, a third pair of engaging clutch faces, one of said faces being carried by said second driven disk and the other of said faces being carried by said second friction disk, a fourth pair of engaging clutch faces, one of said faces being carried by said driving disk and the other of said faces being carried by said second friction disk, the coefficient of friction of one pair of said third and fourth pairs being greater than the coefficient of friction of the other pair of said third and fourth pairs below a predetermined temperature and less than the coefficient of friction of said other of said third and fourth pairs above said predetermined temperature.

6. A friction clutch according to claim 5 wherein said output element is a driven shaft and said driven disks are mounted on and connected to said driven shaft to impart rotation thereto, and wherein said driving disk and said friction disks are freely mounted on said driven shaft.

7. A friction clutch according to claim 6 wherein said driving disk, said friction disks and said second driven disk are biased toward said driven disk by spring means freely mounted on said driven shaft.

8. A friction clutch according to claim 7 wherein said clutch faces are integral with the respective said disks, and said driving disk is of thermoplastic material and said driven disks and said friction disks are of metal.

* * * * *